(12) United States Patent
Sainath et al.

(10) Patent No.: US 10,360,901 B2
(45) Date of Patent: Jul. 23, 2019

(54) LEARNING FRONT-END SPEECH RECOGNITION PARAMETERS WITHIN NEURAL NETWORK TRAINING

(71) Applicant: Nuance Communications, Inc., Burlington, MA (US)

(72) Inventors: Tara N. Sainath, Burlington, MA (US); Brian E. D. Kingsbury, Cortlandt Manor, NY (US); Abdel-rahman Mohamed, Toronto (CA); Bhuvana Ramabhadran, Mount Kisco, NY (US)

(73) Assignee: Nuance Communications, Inc., Burlington, MA (US)

( * ) Notice: Subject to any disclaimer, the term of this patent is extended or adjusted under 35 U.S.C. 154(b) by 131 days.

(21) Appl. No.: 14/561,811

(22) Filed: Dec. 5, 2014

(65) Prior Publication Data

US 2015/0161995 A1   Jun. 11, 2015

Related U.S. Application Data

(60) Provisional application No. 61/913,088, filed on Dec. 6, 2013.

(51) Int. Cl.
*G10L 15/16* (2006.01)
*G10L 15/06* (2013.01)
*G10L 15/02* (2006.01)
*G10L 25/18* (2013.01)

(52) U.S. Cl.
CPC ............ *G10L 15/16* (2013.01); *G10L 15/063* (2013.01); *G10L 15/02* (2013.01); *G10L 25/18* (2013.01)

(58) Field of Classification Search
None
See application file for complete search history.

(56) References Cited

U.S. PATENT DOCUMENTS 5,749,066 A * 5/1998 Nussbaum ............ G10L 15/063
704/232
2010/0280827 A1* 11/2010 Mukerjee .............. G10L 15/142
704/236

(Continued)

OTHER PUBLICATIONS

Geoffrey, Deep Neural Networks for Acoustic modelling in Speech Recognition, Apr. 27, 2012, pp. 1-27 URL: http://static.googleusercontent.com/media/research.google.com/en//pubs/archive/38131.pdf.*

(Continued)

*Primary Examiner* — Richa Mishra
(74) *Attorney, Agent, or Firm* — Wolf, Greenfield & Sacks, P.C.

(57) ABSTRACT

Techniques for learning front-end speech recognition parameters as part of training a neural network classifier include obtaining an input speech signal, and applying front-end speech recognition parameters to extract features from the input speech signal. The extracted features may be fed through a neural network to obtain an output classification for the input speech signal, and an error measure may be computed for the output classification through comparison of the output classification with a known target classification. Back propagation may be applied to adjust one or more of the front-end parameters as one or more layers of the neural network, based on the error measure.

26 Claims, 7 Drawing Sheets

(56) References Cited

U.S. PATENT DOCUMENTS

| | | | |
|---|---|---|---|
| 2011/0191101 A1* | 8/2011 | Uhle | G10L 21/0208 704/205 |
| 2014/0257804 A1* | 9/2014 | Li | G10L 15/16 704/232 |
| 2015/0154002 A1* | 6/2015 | Weinstein | G06F 3/167 715/728 |

OTHER PUBLICATIONS

Tom, A Novel Feature Transformation for Vocal Tract Length Normalization in Automatic Speech Recognition, Nov. 1998, IEEE, p. 549-557 URL: http://ieeexplore.ieee.org/stamp/stamp.jsp?arnumber=725321.*

Deng, Estimating Cepstrum of Speech Under the Presence of Noise Using a Joint Prior of Static and Dynamic Features, May 2004, IEEE, pp. 218-233 URL: http://research.microsoft.com/pubs/63620/2004-deng-sap.pdf.*

G. E. Hinton, N. Srivastava, A. Krizhevsky, I. Sutskever and R. R. Salakhutdinov; Improving neural networks by preventing co-adaptation of feature detectors, Jul. 2012; Pertinent pp. 1-17 URL:https://arxiv.org/pdf/1207.0580.pdf?utm_content=buffer3e047&utm_medium=social&utm_source=twitter.com&utm_campaign=buffer.*

Ossama Abdel-Hamid, Abdel-rahman Mohamed, Hui Jiang,Gerald Penn; Applying convolutional neural networks concept to hybrid NN-HMM model for speech recognition, Aug. 2012, IEEE, pp. 4277-4280 URL: http://ieeexplore.ieee.org/stamp/stamp.jsp?tp=&arnumber=6288864.*

Igor Szöke ; F. Grézl; J. Cernocký; M. Fapšo ; TomášCipr; Acoustic keyword spotter—optimization from end-user perspective; IEEE; Date of Conference: Dec. 12-15, 2010; URL: https://ieeexplore.ieee.org/document/5700849.*

Qiguang Lin, Chiwei Che; Normalizing The Vocal Tract Length for Speaker Independent Speech Recognition; IEEE; Date Nov. 1995 URL: https://ieeexplore.ieee.org/stamp/stamp.jsp?arnumber=473645.*

Ossama Abdel-Hamid, Abdel-rahman Mohamed, Hui Jiang,Gerald Penn; Applying convolutional neural networks concept to hybrid NN-HMM model for speech recognition, Aug. 2012, IEEE, pp. 4277-4280 URL: http://ieeexplore.ieee.org/stamp/stamp.jsp?tp=&arnunnber=6288864.*

Iqbal, Nonlinear spectral transformations for robust speech recognition, 2003, IEEE, pp. 392-398 URL: http://ieeexplore.ieee.org/stamp/stamp.jsp?arnumber=1318473.*

G. E. Hinton, N. Srivastava, A. Krizhevsky, I. Sutskever and R. R. Salakhutdinov; Improving neural networks by preventing co-adaptation of feature detectors, Jul. 2012; Pertinent pp. 1-17 URL:https://arxiv.org/pdf/1207.0580.pdf?utm_content=buffer3e047&utm_medium=social&utm_source=twitter.com&utm_campaign=buffe.*

Abdel-Hamid et al., Applying Convolutional Neural Network Concepts to Hybrid NN-HMM Model for Speech Recognition. Proc. ICASSP, 2012; 4277-80.

Burget et al., Data Driven Design of Filter Bank for Speech Recognition. Text, Speech and Dialogue. Conference Paper. Jan. 2001;1-7.

Deng et al., A Deep Convolutional Neural Network using Heterogeneous Pooling for Trading Acoustic Invariance with Phonetic Confusion. Proc. ICASSP, 2013;6669-73.

Hinton et al., Deep Neural Networks for Acoustic Modeling in Speech Recognition. IEEE Signal Processing Magazine. 2012;29(6):82-97.

Hung et al., Optimization of Temporal Filters for Constructing Robust Features in Speech Recognition. IEEE Transaction on Audio, Speech and Language Processing, 2006;14(3):808-32.

Sainath et al., Deep Convolutional Neural Networks for LVCSR. Proc. ICASSP, 2013;8614-8.

Sainath et al., Improvements to Deep Convolutional Neural Networks for LVCSR. Proc. ASRU, 2013;315-20.

Sainath et al., Making Deep Belief Networks Effective for Large Vocabulary Continuous Speech Recognition. Proc ASRU 2011;30-5.

Suh et al., Data-Driven Filter-Bank-based Feature Extraction for Speech Recognition. SPECOM, $9^{th}$ Conference. Speech and Computer. St. Petersburg, Russia. Sep. 20-22, 2004;1-4.

* cited by examiner

LEARNING FRONT-END SPEECH RECOGNITION PARAMETERS WITHIN NEURAL NETWORK TRAINING

CROSS-REFERENCE TO RELATED APPLICATIONS

This application claims the benefit under 35 U.S.C. § 119(e) of U.S. Provisional Application No. 61/913,088, filed Dec. 6, 2013, entitled "LEARNING FRONT-END SPEECH RECOGNITION PARAMETERS WITHIN NEURAL NETWORK TRAINING," which is hereby incorporated herein by reference in its entirety.

BACKGROUND

Designing appropriate feature representations for speech recognition has been an active area of research for many years. For example, in large vocabulary continuous speech recognition systems, huge gains in performance are observed by using speaker-adapted and discriminatively trained-features, learned via objective functions such as feature-space maximum likelihood linear regression (fMLLR), and feature-space boosted maximum mutual information (fBMMI). In addition, designing appropriate classifiers given these features has been another active area of research, where popular modeling approaches include Deep Neural Networks (DNNs) or Gaussian Mixture Models which have been discriminatively trained.

SUMMARY

One type of embodiment is directed to a method comprising: obtaining an input speech signal; applying front-end speech recognition parameters to extract features from the input speech signal; feeding the extracted features through a neural network to obtain an output classification; comparing the output classification to a target classification to compute an error measure; and applying back propagation to adjust one or more of the front-end speech recognition parameters as one or more layers of the neural network based on the error measure.

Another type of embodiment is directed to a method comprising: obtaining a power spectrum of an input frame of a speech signal; passing the power spectrum through a filter bank comprising a plurality of weights to create a filter bank output, each weight of the plurality of weights operating on a subset of frequency components of the power spectrum; processing the filter bank output to generate a set of features of the input frame; feeding the generated features through a neural network to obtain an output classification; comparing the output classification to a target classification to compute an error measure; and applying back propagation to adjust the plurality of weights as a layer of the neural network based on the error measure.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
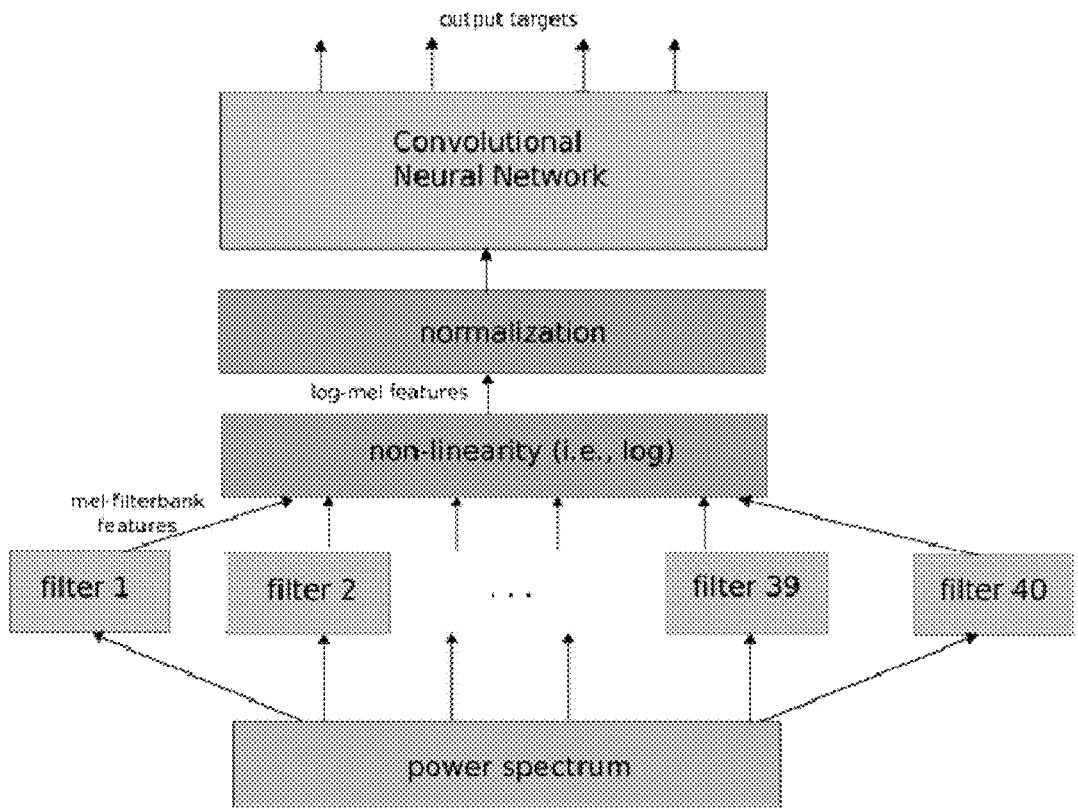
FIG. 1 illustrates Log Mel-filter bank Feature Generation as Input into a CNN.

Mel-filter banks are commonly used in speech recognition, as they are motivated from theory related to speech production and perception. While features derived from mel-filter banks are quite popular, the inventors have recognized that this filter bank is not really an appropriate choice as it is not learned for the objective at hand, i.e. speech recognition. Some embodiments described herein replace the filter bank with a filter bank layer that is learned jointly with the rest of a deep neural network. Thus, the filter bank is learned to minimize cross-entropy, which is more closely tied to the speech recognition objective. On a 50-hour English Broadcast News task, we show that we can achieve a 5% relative improvement in word error rate (WER) using the filter bank learning approach, compared to having a fixed set of filters.

Designing appropriate feature representations for speech recognition has been an active area of research for many years. For example, in large vocabulary continuous speech recognition systems, huge gains in performance are observed by using speaker-adapted and discriminatively trained-features, learned via objective functions such as feature-space maximum likelihood linear regression (fMLLR), and feature-space boosted maximum mutual information (fBMMI). In addition, designing appropriate classifiers given these features has been another active area of research, where popular modeling approaches include Deep Neural Networks (DNNs) or Gaussian Mixture Models which have been discriminatively trained.

Oftentimes feature design is done separately from classifier design. This has a drawback that the designed features might not be best for the classification task. Deep Neural Networks are attractive because they have been shown to do feature extraction jointly with classification. In fact, it has been shown that the lower layers of DNNs produce speaker-adapted features, while the upper layers of DNNs perform class-based discrimination. For years, speech researchers have been using separate modules for speaker adaptation (i.e. fMLLR) and discriminative training (i.e. fBMMI) for GMM training. One reason we believe DNNs are more powerful than GMMs is that this feature extraction is done jointly with the classification, such that features are tuned to the classification task at hand, rather than separately before classification.

One problem with DNNs is that they are not explicitly designed to reduce translational frequency variance within speech signals, which can exist due to different speaking styles. While DNNs could remove variance with a large enough number of parameters or having a lot of data, this can often be infeasible. Alternatively, fMLLR transformations look to address the issue of translational variance by mapping speech from different speakers into a canonical space. Therefore, fMLLR features are used in conjunction with DNNs to give optimal performance. Convolutional Neural Networks (CNNs) are better feature extractors than DNNs, as they reduce translational variance with far fewer parameters compared to DNNs, jointly while doing class-based discrimination. Therefore, with very simple features, i.e. VTLN-warped log-mel filter bank features, it has been shown than CNNs offered a 4-12% relative improvement in WER over DNNs across a variety of different LVCSR tasks. This result indicates that giving the CNN very simple features, and having it learn appropriate feature extraction and discrimination via an objective function related to speech recognition, is much more powerful than providing a DNN hand-crafted features.

Yet, one of the drawbacks with current CNN work in speech is that the most commonly used features are log-mel filter bank features. The mel filter bank is inspired by auditory and physiological evidence of how humans perceive speech signals. We argue that a filter bank that is designed from perceptual evidence is not always guaranteed to be the best filter bank in a statistical modeling framework where the end goal is word error rate. We have seen examples of this with Hidden Markov Models (HMM) in acoustic modeling. HMMs have remained the dominant acoustic modeling technique to date, despite their frame independence assumption which is absent in human speech processing.

The creation of log-mel features is done by passing a power spectrum through a mel-filter bank, followed by a non-linear log operation. This process can be modeled by a layer of a neural network, which has a linear weight multiplication (i.e. filter bank layer), followed by a non-linearity (i.e., log). In this work, with even simpler features (e.g., power spectral features), we explore learning the mel-filter bank layer jointly with a deep CNN. This ensures that the filter bank is learned for the task at hand. Data-driven learning of filter banks has been explored in a variety of contexts.

For example, filter banks have been derived directly from phonetically labeled speech data using Linear Discriminant Analysis (LDA), though it was argued that the derived filter banks were not optimal as LDA expects the data to have a Gaussian distribution, which is not true for power spectra. In addition, using the Kullback-Leibler (KL) distance as the measure in the filter-bank design has been investigated, though the filter was still designed independently of the acoustic model. Alternatively, a discriminative filter bank model has been learned jointly with a classifier using a discriminative training criterion. However, that work looked at a relatively simple distance-based classifier. In this work, we explore filter bank learning given a powerful, state-of-the art deep CNN acoustic model where filter bank learning is incorporated into the learning of CNN parameters. The benefit of using a neural network is that filter bank learning can be seen as an extra layer of the neural network, where filter bank parameters are updated along with the parameters in subsequent layers. To our knowledge, this is the first attempt at doing filter bank learning with deep neural networks.

Our filter bank learning experiments are performed on a 50-hr English Broadcast News (BN) task. The baseline system, a state-of-the art deep CNN trained on log-mel filter bank features, has a WER of 22.3%. We find that applying filter bank learning directly into the CNN, we get a modest improvement of 22.0%. By normalizing features before passing them to the filter bank, which has been shown to be very important for neural network training, a WER of 21.3% is attained. Finally, incorporating pooling into the filter bank layer, provides a WER of 21.1%, which gives a 5% relative reduction in WER compared to a strong CNN baseline.

Filter Bank Learning

The process of generating log mel-filter bank features from the power spectrum, and then training a convolutional neural network is depicted in FIG. 1. Specifically, mel features are generated by passing the power spectrum through a set of mel-filters, depicted as "filter 1-40" in FIG. 1. 40 mel-filters is a common number of filters to use in speech recognition tasks. Then applying a log-compression gives log-mel filter bank features. The features are then normalized before passing them as input to the CNN.

Conventionally, the feature-generation process is separate from the CNN training process. However, the inventors have appreciated that looking at the feature generation process in FIG. 1, we can see that log-mel features are produced by multiplying power spectral features by a set of weights (i.e. filters), followed by a non-linearity (i.e., log). This is very similar to the behavior of one layer of a neural network. However, instead of having one set of weights which are used for all time and frequency components, a limited weight sharing idea is utilized, where weights are replicated at least once within a small localized frequency region. Because both the weight multiplication and non-linearity are differentiable functions, this means we should be able to "learn" the filters jointly with the rest of the neural network. One benefit of this approach is that filters are learned via a cross-entropy objective function and for the speech recognition objective at hand, rather than designed ahead of time.

To describe filter bank learning more mathematically, first denote $\vec{f}$ as the input power spectral feature. Furthermore, denote $\exp(\vec{W}_i)$ as the weights for filter bank i, which span over a small local frequency region of the power spectrum. Here $\exp(\vec{W}_i)$ denotes an element-wise operation. The individual elements j of weight vector for filterbank i are denoted as $\exp(W_{i,j}) \in \exp(\vec{W}_i)$. The exponent operation ensures that the filterbank weights are positive. In addition, $\vec{f}_i \in \vec{f}$ are the power spectral components which correspond to filter bank i, and $f_{i,j} \in \vec{f}_i$ are the individual frequency components j that span over filter bank region i. The mel-filter bank output $m_i$ for filter bank i is given by Equation 1.

$$m_i = \exp(\vec{W}_i^T)\vec{f}_i = \sum_j \exp(W_{i,j}) f_{i,j} \tag{1}$$

Taking the log of $m_i$ gives the log-mel filter bank coefficient for filter bank i, namely $$l_i = \log(m_i) \tag{2}$$

Finally, a global mean-variance normalization is applied to the log-mel features.

This is given by Equation 3, where $\{\mu_i, \sigma_i\}$ define the mean and variance parameters for feature dimension i. These parameters are estimated on the training data ahead of time.

$$n_i = \frac{l_i - \mu_i}{\sigma_i} \tag{3}$$

Back propagation is then applied to learn a set of weights that optimize some objective function L. Typically, these weights are learned through stochastic gradient descent, by taking the derivative of the objective function with respect to the weights, and then updating the weights. For example, the weight update equation for component j in filter bank i, denoted as weight $W_{i,j}$ is shown in Equation 4. Note that we really may want the weight update for $W_{i,j}$ and not $\exp(W_{i,j})$, as the exponent can be thought of as another operation to ensure positive weights.

$$W_{i,j} = W_{i,j} - \eta \frac{\partial L}{\partial W_{i,j}} \quad (4)$$

The derivative of the objective function given weights can be easily calculated by back propagating error gradients from previous layers. Specifically, if $n_i$ in Equation 3 is the output of the filter bank layer, then using the multivariate chain rule, the derivative of the objective function with respect to weight $W_{i,j}$ can be written as Equation 5. Here we assume that the term $$\frac{\partial L}{\partial n_i}$$

is computed using the standard back propagation equations for neural networks.

$$\frac{\partial L}{\partial W_{i,j}} = \frac{\partial L}{\partial n_i} \frac{\partial n_i}{\partial W_{i,j}} \quad (5)$$

Given the definitions for $m_i$ and $l_i$ in Equations 1 and 2 respectively, we can further expand Equation 5 as follows.

$$\frac{\partial L}{\partial W_{i,j}} = \frac{\partial L}{\partial n_i} \frac{\partial n_i}{\partial l_i} \frac{\partial l_i}{\partial m_i} \frac{\partial m_i}{\partial W_{i,j}} \quad (6)$$

$$= \frac{\partial L}{\partial n_i} \frac{1}{\sigma_i} \frac{1}{m_i} \exp(W_{i,j}) f_{i,j}$$

Equation 6 demonstrates how gradients from the neural network stage can be back propagated into the filter bank learning stage. Rather than having hand-crafted filter banks which are not necessarily tuned to the objective at hand, incorporating filter bank learning as an extra stage in the neural network may allow the weights to be updated according to objective function L. In the next few sections, we will discuss results with filter bank learning.

Experiments

Experiments are conducted on a 50-hour English Broadcast News (BN) task. The acoustic models are trained on 50 hours of data from the 1996 and 1997 English Broadcast News Speech Corpora. Results are reported on the EARS dev04f set.

The baseline speaker-independent CNN system is trained with 40 dimensional log mel-filter bank coefficients, which are global mean-and-variance normalized. The architecture of the CNN is similar to T. N. Sainath, A. Mohamed, B. Kingsbury, and B. Ramabhadran, "Deep Convolutional Neural Networks for LVCSR," in *Proc. ICASSP*, 2013, which was found to be optimal for BN. Specifically, the CNN has 2 full weight sharing convolutional layers with 256 hidden units, and 3 fully connected layers with 1,024 hidden units per layer. The final softmax-layer consists of 512 output targets.

Following a recipe similar to T. N. Sainath, B. Kingsbury, B. Ramabhadran, P. Fousek, P. Novak, and A. Mohamed, "Making Deep Belief Networks Effective for Large Vocabulary Continuous Speech Recognition," in *Proc. ASRU*, 2011, during fine-tuning, after one pass through the data, loss is measured on a held-out set and the learning rate is reduced by a factor of 2 if the held-out loss has not improved sufficiently over the previous iteration. Training stops after we have reduced the step size 5 times. All CNNs are trained with cross-entropy, and results are reported in a hybrid setup.

Results

In this section, we present experiments and results with various modifications to the basic filter learning idea presented above.

Filter Learning

First, we explore a direct application of filter learning based on FIG. 1. Specifically, the "learned" filter banks are applied directly on the magnitude of the power spectral coefficients, and then a log is taken. A global mean/variance normalization is applied after the log, and these normalized "learned" log-mel features as passed as input into the CNN. Since it may be beneficial to initialize weights in the lower layers compared to higher layers, the filter bank layer is initialized to be the mel-filter bank, rather than starting from random initialization.

Results with this proposed method of filter learning are shown in Table 1. The learning provides a modest 0.3% improvement in WER over the baseline system with a WER of 22.3%. In the next section, we will discuss what assumptions may not be appropriate for direct filter bank learning, and why improvements are small.

TABLE 1

Direct Application of Filter bank Learning

| Method | WER |
| --- | --- |
| Baseline | 22.3 |
| Filter Learning | 22.0 |

Feature Normalization

Feature normalization may be beneficial in neural network training to achieve good convergence in training. When features are not centered around zero, network updates may be biased towards a particular direction and this may slow down learning. There is even an extreme case when all inputs into a layer are positive. This causes all weights to increase or decrease together for a given input, and thus the weight vector can only change direction by zigzagging which can be slow. This extreme case can be a problem with the direct application of filter bank learning for neural networks, as all the inputs into the filter bank layer are from the magnitude of the power spectrum and are thus positive. In this section, we discuss how to normalize power spectral features for filter learning.

Algorithm

One could directly normalize the power spectral features, and then pass them to a filter bank. However, because the features would be negative, taking the log is not possible. The non-linear log operation is also beneficial in compressing and spreading out features so they can be better used for classifiers.

Given that we want to normalize the power spectral features, but want the output of the filter bank stage to be positive, we explore an idea that is similar to that done in RASTA processing. First, as shown in Equation 7, we take the log of the power spectrum $f_{i,j} \in \vec{f}$, where again i denotes the filter bank and j is the individual frequency component which spans over filter bank i. Then, as shown by Equation 8, the features are normalized to get $l_{i,j}$, which is done completely on the power spectral dimension now. After the normalization is done, an exponent is applied to $l_{i,j}$ in Equation 9, to ensure that the input features into the filter bank, $e_{i,j}$, are positive. Because of the exponent taken after normalization, the log is taken before normalization in Equation 8, to ensure that the new "normalized" features are roughly in the same range as the "un-normalized" features passed into the filter bank described above. The normalized features $e_{i,j} \in e_i$ are then passed through the filter bank i to produce output $m_i$, given by Equation 10, which is then passed as input into the CNN. Equations 7-10 ensure that a normalized and positive feature is passed to the filter bank stage.

$$l_{i,j} = \log(f_{i,j}) \quad (7)$$

$$n_{i,j} = \frac{l_{i,j} - \mu_{i,j}}{\sigma_{i,j}} \quad (8)$$

$$e_{i,j} = \exp(n_{i,j}) \quad (9)$$

$$m_i = \exp(\vec{W}_i^T)\vec{e}_i = \sum_j \exp(W_{i,j})e_{i,j} \quad (10)$$

With the addition of power spectrum-normalization, the back propagation equations change slightly as well. Given objective function L and the error gradient from the previous layer, $$\frac{\partial L}{\partial m_i},$$

the weight update is now given by Equation 11.

$$\frac{\partial L}{\partial W_{i,j}} = \frac{\partial L}{\partial m_i} \frac{\partial m_i}{\partial W_{i,j}} = \frac{\partial L}{\partial m_i} \exp(W_{i,j})e_{i,j} \quad (11)$$

Results and Analysis

Results with filter bank learning using normalized input features are shown in Table 2. By normalizing the input features, we can achieve a 0.7% absolute improvement over un-normalized features, and a 1% absolute improvement in WER over the baseline system. This points to the beneficial impact that feature normalization may have in neural networks.

TABLE 2

Normalized Features for filter bank Learning

| Method | WER |
|---|---|
| Baseline | 22.3 |
| Filter Learning | 22.0 |
| Normalization With Filter Learning | 21.3 |

Figure 2:
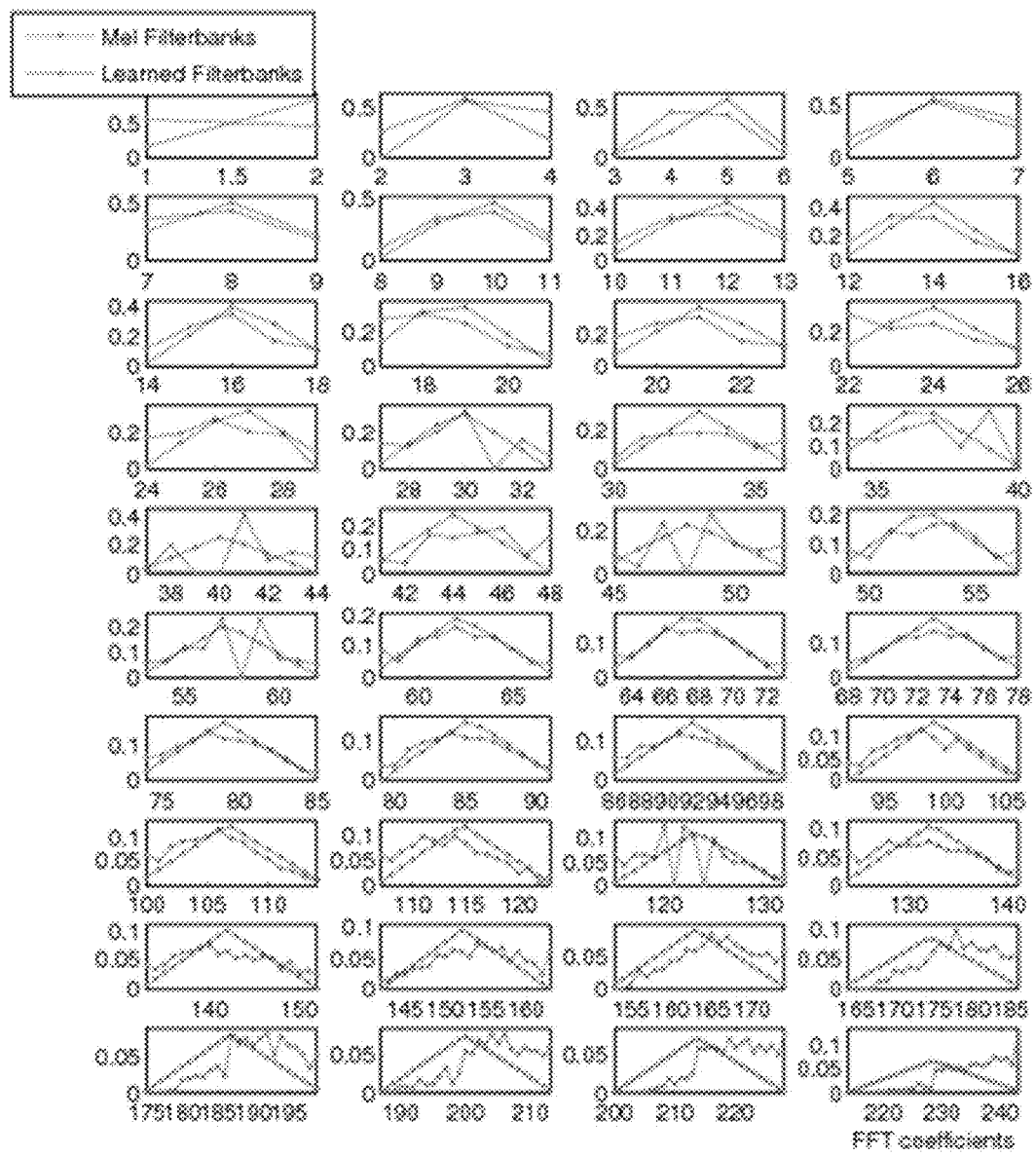
FIG. 2 illustrates Mel-Filterbank vs. Learned Filter banks.

A visual comparison of the 40 mel-filter banks and learned filter banks is shown in FIG. 2. The power spectral frequency components the filters span over are also shown. For visual purposes, the filters have been normalized so they can be compared on the same plot. Notice that for low-frequency regions, both the learned and mel-filters look similar. In the mid-frequency regions, the learned filters seem to have multiple peaks instead of one, indicating they are picking up multiple important critical frequencies rather than just one like the mel. In the high-frequency regions, the filters appear to be high-pass filters compared to the band-pass mel filters.

Figure 3:
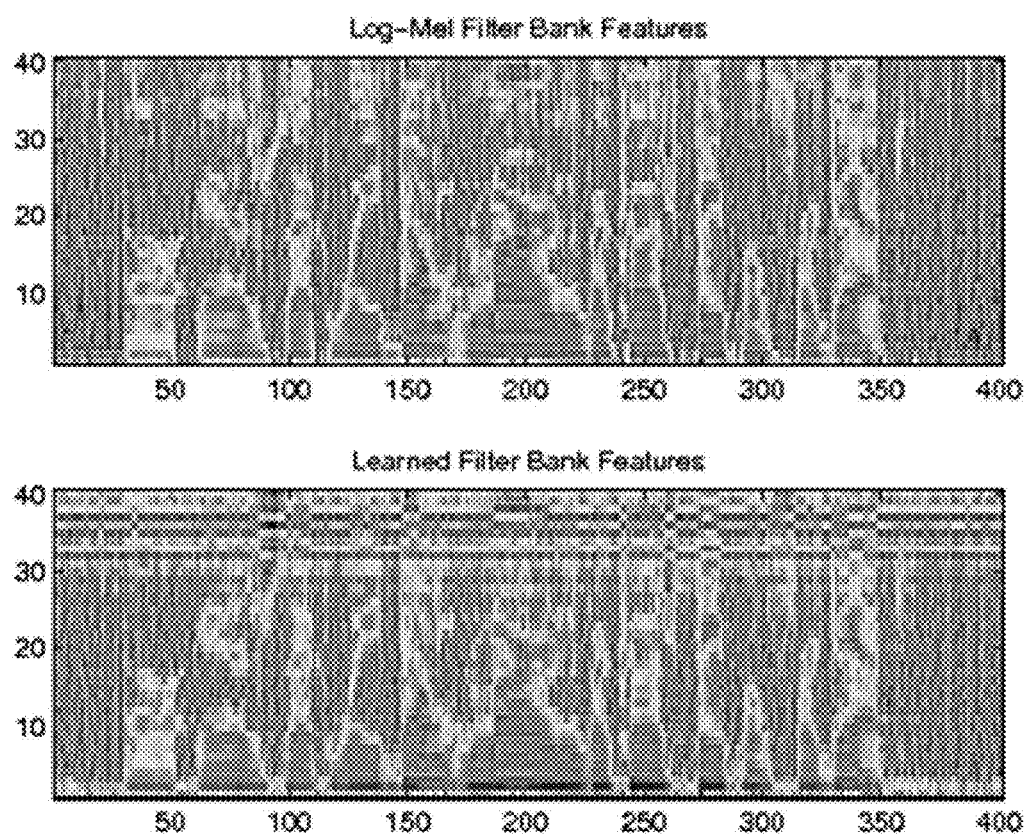
FIG. 3 illustrates Log-Mel Features and Learned Features.

FIG. 3 also plots the log-mel features and learned filter bank features for a specific utterance. The learned features appear similar to the log-mel features, indicating the learned features are meaningful. In the high frequency regions, the features are not as smooth because of the high-pass filters in FIG. 2.

Notice that using a limited weight sharing filter bank layer with one output seems to preserve locality in frequency and allows us to feed the outputs from this layer into a convolutional layer with full weight sharing. Previous work with limited weight sharing used multiple outputs per layer, which did not allow for multiple convolutional layers with full weight sharing as the locality in frequency was not preserved.

Pooling

Because the filter bank layer weights span over small frequency regions and there are multiple weights, this layer can be seen as a convolutional layer with limited weight sharing. Pooling in convolutional layers may help to reduce variance in the input features. A pooling strategy which varies the pooling size for each filter bank layer makes sense, as each power spectrum band is linearly spaced in frequency and contains an unequal amount of information, as reflected by mel-filters having constant Q spacing apart.

A varied pooling strategy for each weight that spans across a localized frequency region (i.e., filter bank), with the acoustic knowledge that it makes sense to pool more in higher frequency regions and less in lower frequency regions, has been coined "heterogeneous pooling". One of the problems with heterogeneous pooling is that the filters are generally shifted by a fixed amount (i.e., one) along the frequency axis during pooling.

Alternatively, we propose a vocal-tract-length-normalization (VTLN)-inspired pooling strategy. Frequency pooling is performed to reduce format translations due to different speaking styles, vocal tract lengths, gender, accents, etc. VTLN is another popular technique to reduce frequency transformations of the input signal. VTLN tries to find the optimal frequency warp factor for each speaker, and map the speech back to a canonical space. Each warp factor generates a shifted and scaled version of the mel filter banks in each frequency region (e.g., 1-40). The warp factor for a given speaker is generally selected via maximum likelihood. For LVCSR tasks, we typically use about 21 different warp factors.

Here, we explore a VTLN-inspired pooling strategy in an unsupervised manner, and use just one filter per frequency region. For each region, we compute the unique locations of the center frequency of the VTLN filters in this region, but ignore the differences in shape of the VTLN filters. During pooling, this corresponds to having filters that are shifted in frequency at center locations defined by the VTLN filters, rather than spaced by a fixed amount as in heterogeneous pooling. However, there is no "optimal" warp factor and corresponding filter bank that is selected for each speaker as is done in normal VTLN, just one filter is used per region.

Results with heterogeneous and VTLN-inspired pooling for the filter bank layer are shown in Table 3. Note that pooling is also performed in the convolutional layers of the CNN, though this is just fixed-size pooling. All pooling layers use a max-pooling strategy. For heterogenous pooling, we tuned the pooling size P in each region, using a linear relationship that pooling in the lower frequency regions should be small, and pooling in the upper layers should be high. We found using a pooling distribution between P=1-8 was optimal, as shown in Table 3. However, heterogeneous pooling does not seem to improve over the baseline.

For VTLN-style pooling, we also tuned the pooling size P. This was done by taking a percentage of the total unique center frequencies for each region. In lower frequencies, we find few unique center frequencies (i.e., between 1-3), while in the higher frequency regions, there are 21 unique center frequencies. Table 3 shows the WER for different % of unique warp factors selected per region, along with the variance of the actual pooling size. Notice that by using 15% of the total unique center frequencies, which corresponds to having a pooling size between 1-3, we can achieve a WER of 21.1%, a 0.2% reduction in WER compared to no pooling.

TABLE 3

WER with Different Pooling Strategies

| Method | Pooling Size (P) | WER |
|---|---|---|
| Baseline | none | 21.3 |
| Heterogeneous pooling | 1-8 | 21.3 |
| VTLN-inspired pooling | 1-3 (15%) | 21.1 |
| VTLN-inspired pooling | 1-5 (25%) | 21.5 |
| VTLN-inspired pooling | 1-7 (35%) | 22.3 |
| VTLN-inspired pooling | 1-16 (75%) | 23.0 |

Figure 4:
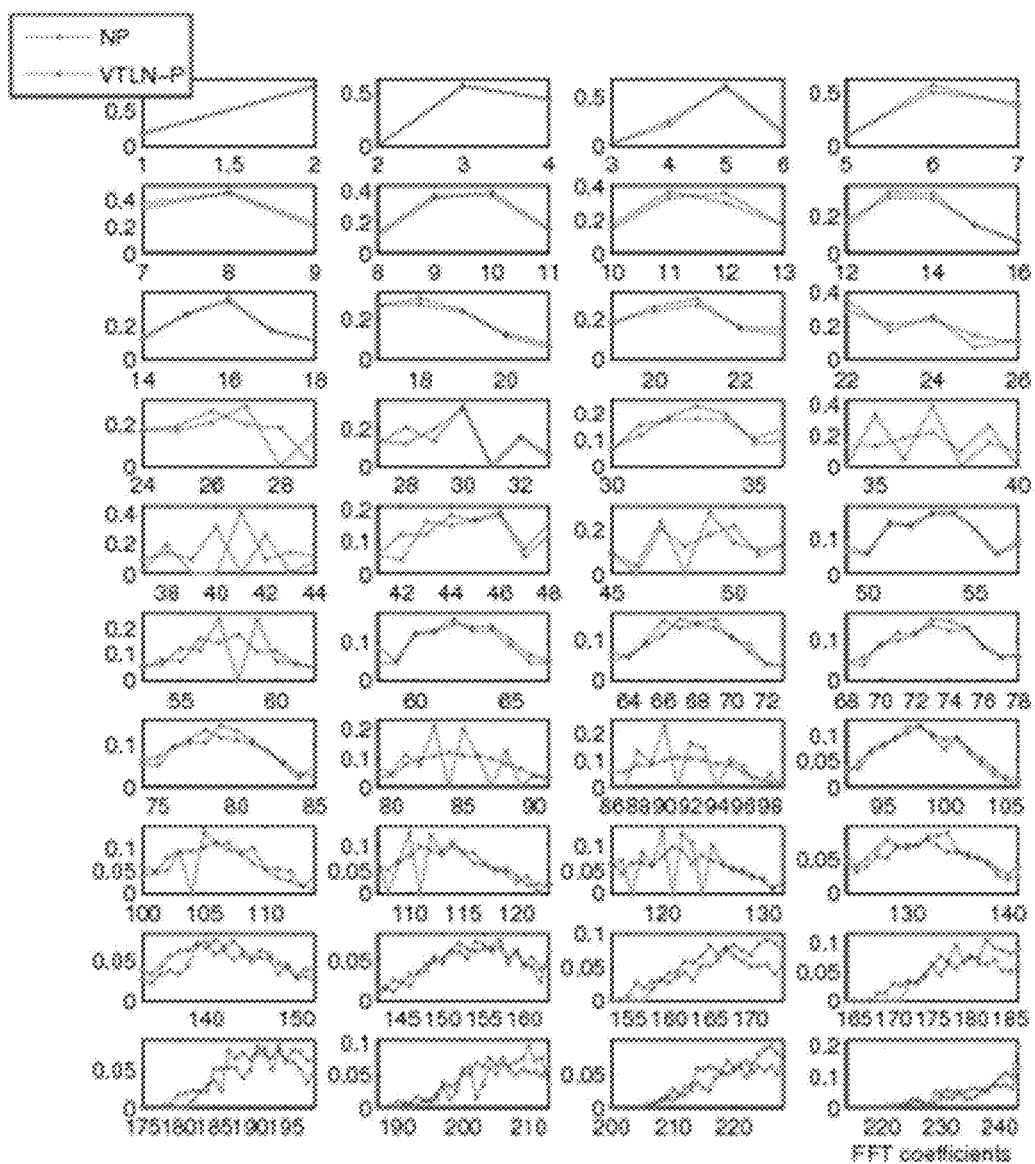
FIG. 4 illustrates Learned Filters with No Pooling and VTLN-style pooling.

A further analysis into the shape of these filters is shown in FIG. 4. The biggest thing to notice is that in the higher-frequency bands where the pooling size is increased, the filters learned from pooling appear to having multiple peaks and are less smooth compared to the no pooling filters. One hypothesis is that pooling is mimicking having the peaks of the multiple VTLN filters, though now in one filter. The real multiple-VTLN filters however span a much greater region in frequency, compared to the learned filter. This inspires us to increase the filter bank size to see if any further improvements are possible.

Increasing Filter Bank Size

In this section, we explore giving more freedom to each filter. With increased filter sizes, this indicates that the mel-filters may not be used as an initial filter. Thus, we explore using a Gaussian filter as the initial filter. Before increasing filter size, we first check if there is a change in WER by using a Gaussian filter as the initial filter. The Gaussian filters peaks at the same point the mel-filters do, but tapers off in a Gaussian manner rather than a triangular manner like the mel-filters. Table 4 shows there is no change in WER by using a Gaussian initialization. This justifies using this type of initialization as we increase filter size.

TABLE 4

WER With Different Filter Initalizations

| Filter Initalization | Filter Size | WER |
|---|---|---|
| Mel-Filter | Baseline Size | 21.3 |
| Gaussian | Baseline Size | 21.3 |

We explored increasing filter size for VTLN-style pooling. Results are shown in Table 5. Notice that for VTLN pooling, increasing the filter size does not help, and keeping the filter-size the same as the mel (i.e. Filter Size Multiple 1.0) seems to be the best. One hypothesis is that perhaps when filter size increases, there is more overlap in frequency between the different filters. Therefore, filters might co-adapt together to explain the same frequency regions, while placing less importance on other frequency components. While dropout is a methodology to prevent co-adaptation, it is most effective where there are a large number of hidden units, which is not the case here.

TABLE 5

WER With Different Filter Size

| Pooling Type | Filter Size Multiple | WER |
|---|---|---|
| VTLN-inspired | 1.00 | 21.1 |
| VTLN-inspired | 1.25 | 21.8 |
| VTLN-inspired | 1.50 | 21.8 |

Regularization

FIGS. 2 and 4 indicate that the learned filters are not smooth and have multiple peaks. At first it may not be clear if this is a good behavior, meaning we are picking up multiple important signals in each band, or this behavior is bad because we give too much freedom to the filter bank weights. In this section, we attempt to answer this question by exploring if enforcing some smoothing between neighboring weights might help. Given weights $W_{i,j} \in \vec{W}_i$ for filter bank i, unsmoothness is measured as follows:

$$\sum_{j=2}^{|W_i|} [W_{i,j} - W_{i,j-1}]^2 \qquad (12)$$

Given this, the new loss function L is defined as the sum of the old loss $L_b$ plus a second term which measures unsmoothness across all filter banks, as shown in Equation 13. Here λ is a constant which weights the loss due to unsmoothness.

$$L = L_b + \lambda \sum_{i=1}^{40} \sum_{j=2}^{|W_i|} [W_{i,j} - W_{i,j-1}]^2 \qquad (13)$$

Finally, the new weight update given this reguarlization is shown in Equation 14. Boundary conditions for the weights when j=0 and j=$|\vec{W}_i|$ are discussed in more detail in J. Jean and J. Wang, "Weight Smoothing to Improve Network Generalization," Neural Networks, IEEE Transactions on, vol. 5, no. 5, pp. 752-763, 1994.

$$\frac{\partial L}{\partial W_{i,j}} = \frac{\partial L_b}{\partial W_{i,j}} + 2\lambda[2W_{i,j} - W_{i,j-1} - W_{i,j+1}] \quad (14)$$

Table 6 shows the WER with and without neighboring weight smoothing. Note that λ is tuned on a held-out set. For a non-zero λ, we find that smoothing causes an increase in WER. This indicates that multiple peaks in each filter is good.

TABLE 6

WER With Neighboring Weight Smoothing

| Method | WER |
|---|---|
| No smoothing | 21.1 |
| Smoothing | 21.3 |

Exploration of Negative Weights and Non-Linearities

Having a log as a non-linearity requires that both input features and corresponding weights are positive. In this section, we explore changing the non-linearity, which concurrently removes the constraint that the weights must be positive. Specifically, we explore using a sigmoid non-linearity, which is a popular non-linearity used in neural networks. We also investigate using a cube-root, which is inspired by its use in Perceptual Linear Predictive (PLP) features. Since these non-linearities are centered around zero, we allow the weights to have negative values, which removes the exponent in Equation 10.

Table 7 shows the results for different non-linearities. It appears that using the log non-linearity with positive weights is the best. This experimentally justifies that a filter bank which has a logarithmic non-linearity that corresponds to human perception of loudness, is a sensible choice.

TABLE 7

WER With Different Non-Linearities

| Non-Linearity | Weight Constraints | WER |
|---|---|---|
| Log | Positive | 21.3 |
| Sigmoid | None | 23.5 |
| Cube Root | None | 24.3 |

Conclusions

We have explored adding a filter bank layer as an extra layer into a CNN. The filter bank is learned jointly with the rest of the network parameters to optimize the cross-entropy objective function. Thus, instead of having a perceptually motivated filter bank which is not necessarily correlated to the speech recognition objective, the filter is learned for the task at hand. However, we do find that using a non-linear perceptually motivated log function is appropriate. We introduce a novel idea of normalizing filter-bank features while still ensuring they are positive so that the logarithm non-linearity can be applied. Second, we explore a VTLN-inspired pooling strategy. On a 50-hour BN task, the proposed filter-learning strategy has a WER of 21.1%, a 5% relative improvement over a baseline CNN with hand-crated mel-filter bank features with a WER of 22.3%.

Improvements to Filterbank and Delta Learning within a Deep Neural Network Framework Many features used in speech recognition tasks are hand-crafted and are not always related to the objective at hand, that is minimizing word error rate. Above, we showed that replacing a perceptually motivated mel-filter bank with a filter bank layer that is learned jointly with the rest of a deep neural network was promising. Now, we extend filter learning to a speaker-adapted, state-of-the-art system. First, we incorporate delta learning into the filter learning framework. Second, we incorporate various speaker adaptation techniques, including VTLN warping and speaker identity features. On a 50-hour English Broadcast News task, we show that we can achieve a 5% relative improvement in word error rate (WER) using the filter and delta learning, compared to having a fixed set of filters and deltas. Furthermore, after speaker adaptation, we find that filter and delta learning allows for a 3% relative improvement in WER compared to a state-of-the-art CNN.

Designing appropriate feature representations for speech recognition has been an active area of research for many years. For example, in large vocabulary systems, improvements in WER are observed by using speaker-adapted and discriminatively trained features. However, oftentimes feature design is done separately from classifier design, and thus the designed features might not be best for the classification task. Deep neural networks are attractive because they have been shown to do feature extraction jointly with classification such that features are tuned to the classification task.

Convolutional neural networks (CNNs) are a specific type of DNN that have shown state-of-the-art performance across a variety of small and large vocabulary tasks. The most popular features to use with CNNs are hand-crafted log-mel filter bank features. The mel-filter bank is inspired by auditory and physiological evidence of how humans perceive speech signals. We argue that a filter bank that is designed from perceptual evidence is not always guaranteed to be the best filter bank in a statistical modeling framework where the end goal is word error rate (WER). Log-mel features are created by passing a power spectrum through a mel-filter bank, followed by a non-linear log operation, which can be modeled as one layer of a neural network, which we showed to be promising above.

Now, we extend the work above in a variety of ways. First, it has been shown that log-mel features and their time dynamic information (represented by deltas (d) and double deltas (dd)) may be better than using just static log-mel features. The delta operation can be seen as a linear operation on log-mel features, and can also be learned by a neural network. Some embodiments incorporate delta learning into our filter learning framework.

Second, the work above was presented on a speaker independent (SI) system. Oftentimes we see that gains demonstrated on an SI system disappear once speaker adaptation is incorporated. To show that this is not the case here, we add speaker adaptation into the filter and delta learning framework using two methodologies. Vocal tract length normalization (VTLN) is a popular technique that warps the speech from different speakers and different vocal tract lengths into a canonical speaker with an average vocal tract length. While typically VTLN-warping is applied to the filterbank, it can also be applied directly on the power spectra, and we follow this implementation in our filter and delta learning framework. In addition, we explore adapting the CNN to the target speaker through the use of identity vectors (i-vectors), which had been previously explored for speaker adaptation of DNNs.

Data-driven learning of filters has been explored in a variety of contexts. For example, deriving RASTA-like filters from phonetically labeled speech data using Linear Discrimininant Analysis (LDA) has been investigated. Furthermore, constructing temporal filters using principal component analysis (PCA) and the minimum classification error (MCE) criterion has been looked at. In addition, a discriminative filter bank model has been learned jointly with a classifier using a discriminative training criterion, though based on a relatively simple distance-based classifier. Our work differs from previous work in that filter and delta learning is performed within a neural network framework. As neural networks are state-of-the-art acoustic models, this allows for the filter and delta learning to be done on a strong acoustic model rather than a simpler classifier.

Our experiments are performed on a 50-hr English Broadcast News (BN) task. The baseline system, a state-of-the-art deep CNN trained on log-mel filter bank+d+dd features, has a WER of 19.5%. Using filter and delta learning, we achieve a WER of 18.6%, a 5% relative reduction. By incorporating VTLN and i-vectors, the baseline WER improves to 17.8%. Incorporating both of these techniques into the delta and filter learning network achieves a WER of 17.3%, a 3% relative reduction. This demonstrates that filter and delta learning still retain value after speaker adaptation.

Filter and Delta Learning

Convolutional neural networks (CNN) are commonly trained with log-mel filterbank features, as well as the delta and double-delta of these features. While the process of generating these features is conventionally often separate from the CNN training process, the inventors have appreciated that both the filter and delta learning stages can be seen as different layers within a neural network, and can be learned jointly with the rest of the CNN.

Figure 5:
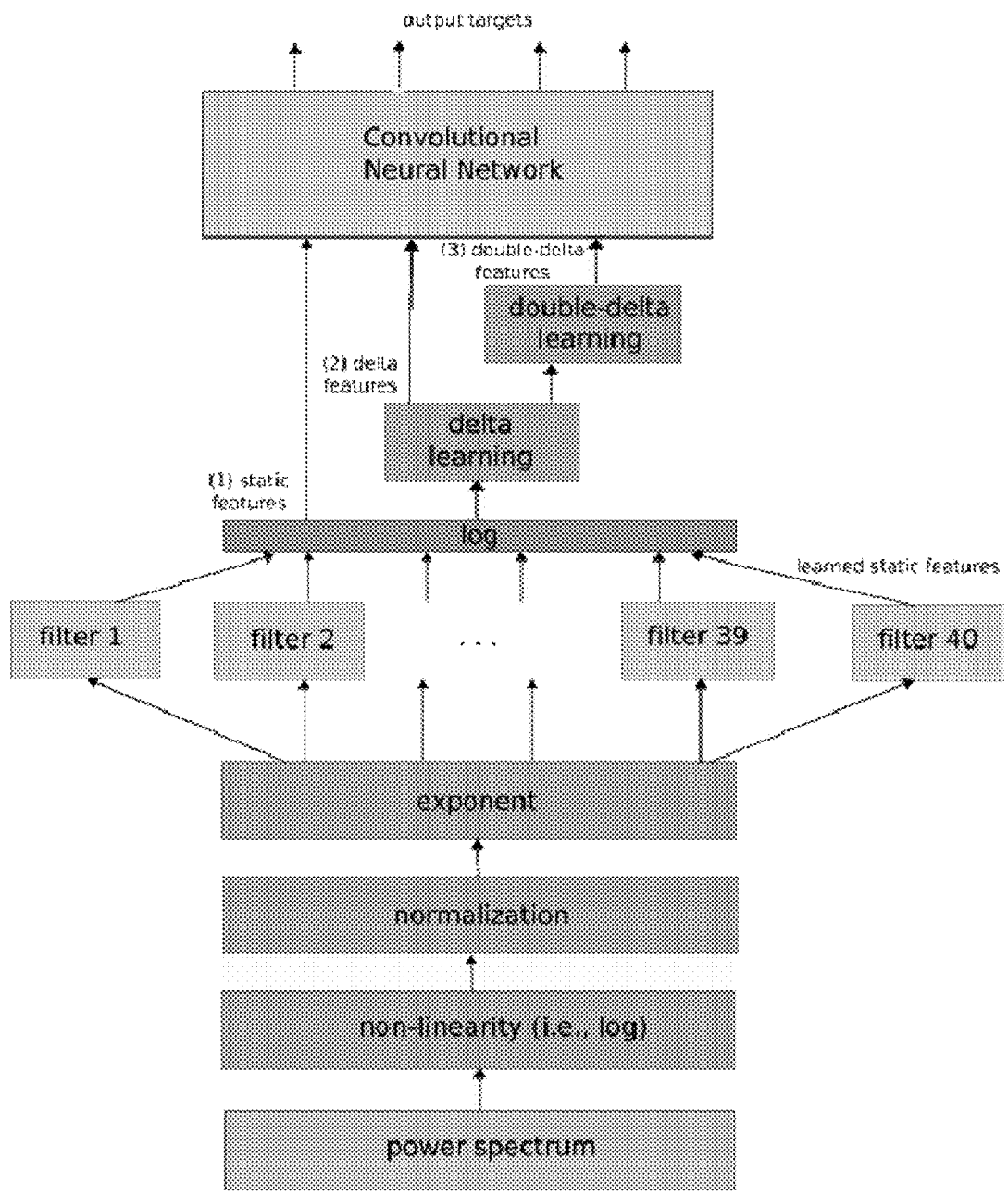
FIG. 5 illustrates Filterbank and Delta Learning Modules With a CNN.

The proposed model for filter and delta learning with a CNN framework is shown in FIG. 5. Note that the input into the filter learning stage is the normalized log of the power spectrum, which is then taken to be positive using the exponent. Applying the normalization before the filter learning may be beneficial. Below, we explain filter and delta learning in more detail.

Feature Generation

To describe filter bank and delta learning more mathematically, first denote $\vec{f}$ as the input power spectral feature. Furthermore, denote $\exp(\vec{W}_i)$ as the weights for filter bank i, which span over a small local frequency region of the power spectrum. Here $\exp(\vec{W}_i)$ denotes an element-wise operation. The individual elements j of weight vector for filterbank i are denoted as $\exp(W_{i,j}) \in \exp(\vec{W}_i)$. The exponent operation ensures that the filterbank weights are positive. In addition, $\vec{f}_i \in \vec{f}$ are the power spectral components which correspond to filter bank i, and $f_{i,j} \in \vec{f}_i$, are the individual frequency components j that span over filter bank region i.

Following the filter-bank learning idea presented above, as shown in Equation 15, we take the log of the power spectrum $f_{i,j} \in \vec{f}$. Then, as shown by Equation 16, the features are normalized using mean and variance parameters $\{\mu_{i,j}, \sigma_{i,j}\}$ to get $n_{i,j}$. After the normalization, an exponent is applied to $n_{i,j}$ in Equation 17, to ensure that the input features into the filter bank, $e_{i,j}$, are positive. The normalized features $e_{i,j} \in e_i$ are then passed through the filter bank i, and the log is taken, to produce output $m_i$ given by Equation 18.

$$l_{i,j} = \log(f_{i,j}) \tag{15}$$

$$n_{i,j} = \frac{l_{i,j} - \mu_{i,j}}{\sigma_{i,j}} \tag{16}$$

$$e_{i,j} = \exp(n_{i,j}) \tag{17}$$

$$m_i = \log\left(\exp(\vec{W}_i^T)\vec{e}_i\right) = \log\left(\sum_j \exp(W_{i,j})e_{i,j}\right) \tag{18}$$

Given the filterbank features $m_i$, we then compute a time derivative delta of this feature. A common equation for computing delta features is shown in Equation 19, where $\alpha_t$ are the delta coefficients assumed to be integers. A popular choice for $\alpha$ values is $\alpha_1 = 1$ and $\alpha_2 = 2$. Notice that this equation assumes that the coefficients $\alpha_t$ and $-\alpha_t$ are applied to symmetric points $m_{i+\alpha_t}$ and $m_{i+\alpha_t}$. It also assumes that no scaling is applied to the current frame $m_i$ when computing $m_i^d$, and that this delta coefficient is zero.

$$m_i^d, htk = \frac{\sum_{t=1}^{N} \alpha_t(m_{i+\alpha_t} - m_{i-\alpha_t})}{2\sum_{t=1}^{N} \alpha_t^2} \tag{19}$$

Here, we give more freedom to delta coefficients, not requiring them to be symmetric around zero and also allowing for a non-zero delta coefficient at time t=0. Our proposed method for computing deltas is given by Equation 20.

$$m_i^d = \frac{\sum_{t=-N}^{N} \alpha_t m_{i+t}}{\sum_{t=-N}^{N} \alpha_t^2} \tag{20}$$

Similarly, the double-delta of the filterbank feature, is computed by taking the time derivative of the delta filterbank feature $m_i^d$. Our proposed equation for computing double-delta is given by Equation 21, where $\beta_t$ are the double-delta coefficients.

$$m_i^{dd} = \frac{\sum_{t=-M}^{M} \beta_t m_{i+t}^d}{\sum_{t=-M}^{M} \beta_t^2} \tag{21}$$

After computing filterbank and delta features, namely $m_i$, $m_i^d$ and $m_i^{dd}$, these features are then passed as input to the CNN, as indicated by streams (1), (2), and (3) in FIG. 5.

Delta Learning

Backpropagation is applied to learn a set of weights that optimize some objective function L. Typically, these weights are learned through stochastic gradient descent, by taking the derivative of the objective function with respect to the weights, and then updating the weights. For example, using stochastic gradient descent optimization, the weight update for the double-delta coefficient $\beta_t$ is given by Equation 22, where $\gamma$ is the learning rate.

$$\beta_t = \beta_t - \gamma \frac{\partial L}{\partial \beta_t} \quad (22)$$

The derivative of the objective function w.r.t the weights can be easily calculated by back propagating error gradients from previous layers. Specifically, if $m_i^{dd}$ in Equation 21 is the output after computing the double-delta features, then using the multivariate chain rule, the derivative of the objective function with respect to coefficient $\beta_t$ can be written as Equation 23. Here we assume that the term $$\frac{\partial L}{\partial m_i^{dd}}$$

is computed using the standard back propagation equations.

$$\frac{\partial L}{\partial \beta_t} = \frac{\partial L}{\partial m_i^{dd}} \frac{\partial m_i^{dd}}{\partial \beta_t} \quad (23)$$

The update equation for the delta coefficient $\alpha$ is a bit more complicated, as the delta feature $m_i^d$ is computed by back propagating error gradients from both the CNN and double-delta layer, as shown streams (2) and (3) in FIG. 5.

$$\frac{\partial L}{\partial \alpha_t} = \frac{\partial L}{\partial m_i^d} \frac{\partial m_i^d}{\partial \alpha_t} + \frac{\partial L}{\partial m_i^{dd}} \frac{\partial m_i^{dd}}{\partial m_i^d} \frac{\partial m_i^d}{\partial \alpha_t} - 0.1 \text{ in} \quad (24)$$

Filter Learning

After the double-delta and delta coefficients are updated, the last step is to update the filter learning weights. The derivative of the objective function given the filter weights for component j in filter bank i, denoted as weight $W_{i,j}$ is shown in Equation 25. Notice the derivative includes a back propagation term from both the CNN and delta-layer, as shown by streams (1) and (2) in FIG. 5.

$$\frac{\partial L}{\partial W_{i,j}} = \frac{\partial L}{\partial m_i} \frac{\partial m_i}{\partial W_{i,j}} + \frac{\partial L}{\partial m_i^d} \frac{\partial m_i^d}{\partial m_i} \frac{\partial m_i}{\partial W_{i,j}} \quad (25)$$

Equations 23, 24 and 25 demonstrate how both the filter bank and delta computations can be learned jointly with the rest of a CNN.

Experiments

Experiments are conducted on a 50-hour English Broadcast News (BN) task. The acoustic models are trained on 50 hours of data from the 1996 and 1997 English Broadcast News Speech Corpora. Results are reported on the EARS dev04f set.

The baseline CNN system is trained with 40 dimensional log mel-filter features, along with the delta and double-deltas, which are per-speaker mean-and-variance normalized, rather than the speaker-independent globally normalized filter learning system proposed above. The architecture and training recipe of the CNN is similar to T. N. Sainath, A. Mohamed, B. Kingsbury, and B. Ramabhadran, "Deep Convolutional Neural Networks for LVCSR," in Proc. ICASSP, 2013, which was found to be optimal for BN. Specifically, the CNN has 2 full weight sharing convolutional layers with 256 hidden units, and 3 fully connected layers with 1,024 hidden units per layer. The final softmax-layer consists of 512 output targets. All CNNs are trained with cross-entropy, and results are reported in a hybrid setup.

Results with Delta Learning

In this section, we present experiments and results with various modifications to the filter and delta learning idea presented above.

Delta Learning

We explore learning delta and double-delta coefficients in Equations 20 and 21.

First, we investigate the optimal delta size for both static and learned deltas. A delta size of 3, for example, corresponds to fixed delta coefficients of [−1, 0, 1], while a delta size of 5 corresponds to fixed delta coefficients of [−2, −1, 0, 1, 2]. Note that these fixed deltas are used as an initialization in delta learning.

Table 8 shows the WER for different delta sizes. The baseline log-mel+delta (d)+double-delta (dd) system is a 19.5%, with a delta size of 3. If filter learning is applied, and deltas are computed on the output of the filter layer, but not learned, the WER is at 19.1%, with a delta size of 3. Learning the filter and delta coefficients with the strategy outlined above, drops the WER to 18.8%. Note that with delta learning, the optimal size is 5, and a bit more freedom can be given to the deltas. Overall, filter and delta learning offers a 4% relative improvement in WER over the baseline log-mel+d+dd.

TABLE 8

| WER, Filter and Delta Learning | | |
|---|---|---|
| Method | Delta Size | WER |
| Log-mel + fixed d + dd | 3 | 19.5 |
| Log-mel + fixed d + dd | 5 | 19.6 |
| Filter and delta learning | 3 | 19.0 |
| Filter and delta learning | 5 | 18.8 |
| Filter and delta learning | 7 | 19.0 |

A closer look at the learned d+dd coefficients is given in Table 9, compared to the initial d and dd starting point of [−0.2,−0.1,0,0.1,0.2]. First, we see that learned deltas which are symmetric about zero, do not sum to zero, which is very different than the hand-crafted delta filters. Second, the $0^{th}$ delta coefficient is found to be non-zero, again different than hand-crafted delta filters. Overall, this leads to a much different is shape for the delta and double-delta learned filters compared to hand-crafted filters. To understand if the non-zero delta sum and $0^{th}$ coefficient are beneficial, in the next section we explore various regularization techniques to force the learned deltas to behave more like hand-crafted ones.

TABLE 9

Learned Delta and Double-Delta Coefficients

| Index | t = −2 | t = −1 | t = 0 | t = 1 | t = 2 |
|---|---|---|---|---|---|
| $\alpha_t$ | 0.155 | −0.003 | −0.089 | 0.002 | 0.153 |
| $\beta_t$ | −0.454 | −0.121 | 0.011 | 0.130 | 0.481 |

Delta Learning Regularization
Total Delta Sum=0

The first regularization we explore is to ensure that the sum of all delta coefficients is zero. The new loss function L is defined as the sum of the unpenalized $L_b$ plus a penalty term which tries to drive the sum of the deltas to zero, as shown in Equation 26. Here λ is a constant which weights the penalty term. The same regularization is also applied to the double-delta filters.

$$L = L_b + \lambda \left( \sum_{t=-N}^{N} \alpha_t \right)^2 - 0.05 \text{ in} \quad (26)$$

Symmetric Delta Only Sum=0 The second regularization we explore is to ensure that symmetric delta terms, in other words α_t and $α_t$, sum to zero. The new loss in Equation 27 includes a penalty term which tries to drive the sum of symmetric deltas to zero, as shown in Equation 27.

$$L = L_b + \lambda \sum_{t=1}^{N} (\alpha_{t-N} + \alpha_{t+N})^2 - 0.05 \text{ in} \quad (27)$$

Enforcing $0^{th}$ Delta=0

Finally, the third regularization explored is to force the $0^{th}$ delta coefficient to go to zero after updating the delta weights.

Results

Results with different delta regularizations are shown in Table 10. We can see that all of the regularization techniques degrade the WER. This helps justify our results that an appropriate delta and double-delta need not have coefficients symmetric about zero nor sum to zero, and also that the $0^{th}$ delta coefficient need not be zero.

TABLE 10

WER, Delta Regularization

| | |
|---|---|
| Filter and delta learning, No Regularization | 18.8 |
| Filter and delta learning, Total Sum = 0 | 19.0 |
| Filter and delta learning, Symmetric Sum = 0 | 19.0 |
| Filter and delta learning, $0^{th}$ | 19.2 |

Delta Learning Per Dimension

Another drawback of static deltas is that the same coefficient $α_t$ is applied to all dimensions of the feature vector $m_t \in \Re^N$. There is no reason to believe that each feature dimension should have exactly the same delta. For example, low-frequency regions have different time-dynamic information than high-frequency regions, and it seems plausible that speech is more suited to having a different delta per dimension. Table 11 shows that delta learning per dimension offers a small improvement over learning one delta for all dimensions. Overall, we see that delta and filter learning offers a 5% relative improvement over using fixed filters and deltas.

TABLE 11

WER, Filter and Delta Learning

| Method | WER |
|---|---|
| Log-mel + d + dd | 19.5 |
| Filter learning + d + dd | 19.1 |
| Filter and delta learning | 18.8 |
| Filter and delta learning, per dimension | 18.6 |

Speaker Adaptation

In this section, we discuss experiments incorporating speaker adaptation into the filter and delta learning framework.

Incorporating VTLN

First, we explore incorporating VTLN into our model. Typically VTLN-warping is applied by constructing filter banks with different frequency warps, and choosing the optimal warped filter bank for each speaker via maximum-likelihood. Since we have just one filterbank (as it is learned), this type of approach for VTLN may not work in our framework. Alternatively, VTLN can also be applied on the power spectra itself, and therefore just one filterbank can be used, which fits much better into our model framework.

Table 12 shows the results with vtln-warping for both the log-mel baseline, and proposed filter+delta learning. Note that for the log-mel system, warping is performed on the filterbank rather than the power-spectra due to implementation efficiency, though we have found no difference in performance by warping either. The table shows that even after vtln-warping, the filter+delta learning system continues to show gains over the baseline.

TABLE 12

WER, Filter and Delta Learning with VTLN

| Method | WER |
|---|---|
| VTLN + log-mel + d + dd | 18.7 |
| VTLN + Filter + delta learning | 18.0 |

Incorporating I-Vectors

Finally, we explore incorporating i-vectors into our model. I-vectors were first explored for DNNs. Since CNNs require features which obey a frequency (and time) locality property, i-vectors cannot be concatenated with the full dimension of learned filter features, which have this locality property. We compare two different methodologies to incorporate i-vectors into CNNs.

I-vectors can be incorporated into the convolutional layer by concatenating the feature with every localized frequency patch. For example, if the CNN sees a 9×9 time-frequency patch of localized features, we concatenate the 100-dimensional i-vectors into this feature so that the new filter size becomes 9×109. Every time the CNN shifts in frequency, the same i-vector is concatenated to the current set of localized features. This idea has been explored before when incorporating the non-localized energy feature into a CNN. Alternatively, since we know i-vectors can be incorporated into fully connected DNN layers, we can use a joint CNN/DNN approach. Specifically, we can feed the i-vectors into one fully connected DNN layer, and then join this output into the first fully connected layer of the CNN. This joint CNN/DNN approach has been explored before for CNNs when combining different feature streams.

Table 13 shows the WER for the two different methodologies. Just for simplicity to avoid the extra dimensions with d+dd, we compare the two different ideas of incorporating i-vectors with just filter learning. We see there is an improvement in WER when i-vectors are incorporated, but there is not a huge difference in final performance when incorporating i-vectors at the CNN or DNN level. Incorporating at the DNN layer is a bit faster, as we do not need to add i-vectors into the localized features for each CNN shift. For this reason, we use this approach for i-vectors in subsequent experiments.

TABLE 13

WER, Incorporating I-vectors into CNNs

| Method | WER |
| --- | --- |
| Filter learning only | 19.5 |
| Filter Learning only + I-vector at CNN level | 18.8 |
| Filter Learning only + I-vector at DNN level | 18.7 |

Table 14 compares the results of VTLN and i-vectors for both the baseline log-mel+d+dd and filter+delta learning systems. After including i-vectors, filter and delta learning still maintains a 3% relative improvement over the baseline, showing the value of this technique over a strong speaker-adapted, state-of-the-art CNN baseline.

TABLE 14

WER, Filter and Delta Learning with VTLN and I-Vectors

| Method | WER |
| --- | --- |
| VTLN log-mel + d + dd + i-vectors | 17.8 |
| VTLN + Filter + delta learning + i-vectors | 17.3 |

Conclusions

We improved the filter learning idea proposed above by incorporating delta learning into this framework. We also presented results on a strong baseline, after incorporating speaker-adaptation techniques such as VTLN and i-vectors. On a 50-hour BN task, the proposed filter and delta learning strategy has a WER of 18.6%, a 5% relative improvement over a baseline log-mel+d+dd. After incorporating speaker adaptation, the filter and delta learning approach has a WER of 17.3%, still showing a 3% relative improvement over the speaker-adapted CNN baseline.

Figure 6:
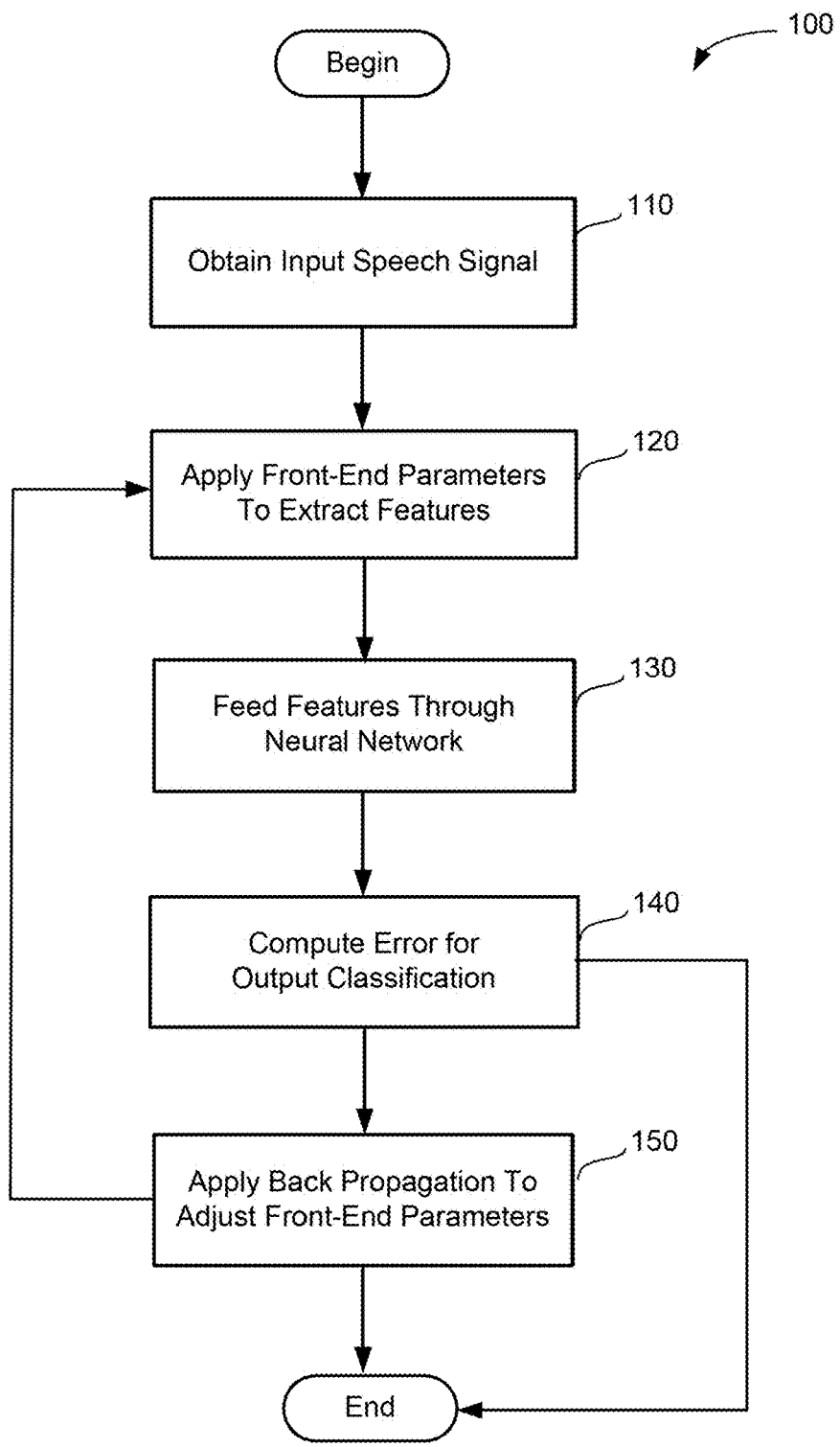
FIG. 6 illustrates an exemplary method for learning front-end speech recognition parameters as part of training a neural network classifier in accordance with some embodiments.

It should be appreciated from the foregoing that one embodiment is directed to a method 100 for learning front-end speech recognition parameters as part of training a neural network classifier, as illustrated in FIG. 6. Method 100 begins at act 110, at which an input speech signal may be obtained. The input speech signal may be in any suitable form, such as in time-domain form or in a frequency representation such as a power spectrum. At act 120, front-end speech recognition parameters may be applied to extract features from the input speech signal. Any suitable types of front-end speech recognition parameters may be used, many of which are known. For example, as discussed above, the front-end parameters may include filter bank coefficients, and/or delta coefficients (which may include double delta coefficients, etc.) for the filter bank features and/or for one or more other types of features. Another example of front-end speech recognition parameters may include parameters used in generating a frequency representation from a time-domain input signal.

At act 130, the features extracted using the front-end parameters may be fed through a neural network to obtain an output classification for the input speech signal. Any suitable neural network classifier may be used, such as a convolutional neural network (CNN) as described above. At act 140, an error measure may be computed for the output classification, e.g., through comparison of the output classification with a known target classification. At act 150, back propagation may be applied to adjust one or more of the front-end parameters as one or more layers of the neural network, based on the error measure. Method 100 may then loop back to act 120, at which the updated (adjusted) front-end parameters may be applied in extracting updated features from the input speech signal. As method 100 continues to iterate, the front-end parameters may continue to be adjusted, through back propagation as one or more layers of the neural network, to reduce the error in the neural network's output classification. When a suitable number of iterations have been completed, or when the error has been reduced below a suitable threshold (or when any other suitable convergence criteria have been reached), method 100 may end. At this point, the front-end feature extraction parameters may have been "learned" to fit the data classification task at hand, as part of training the neural network classifier.

Figure 7:
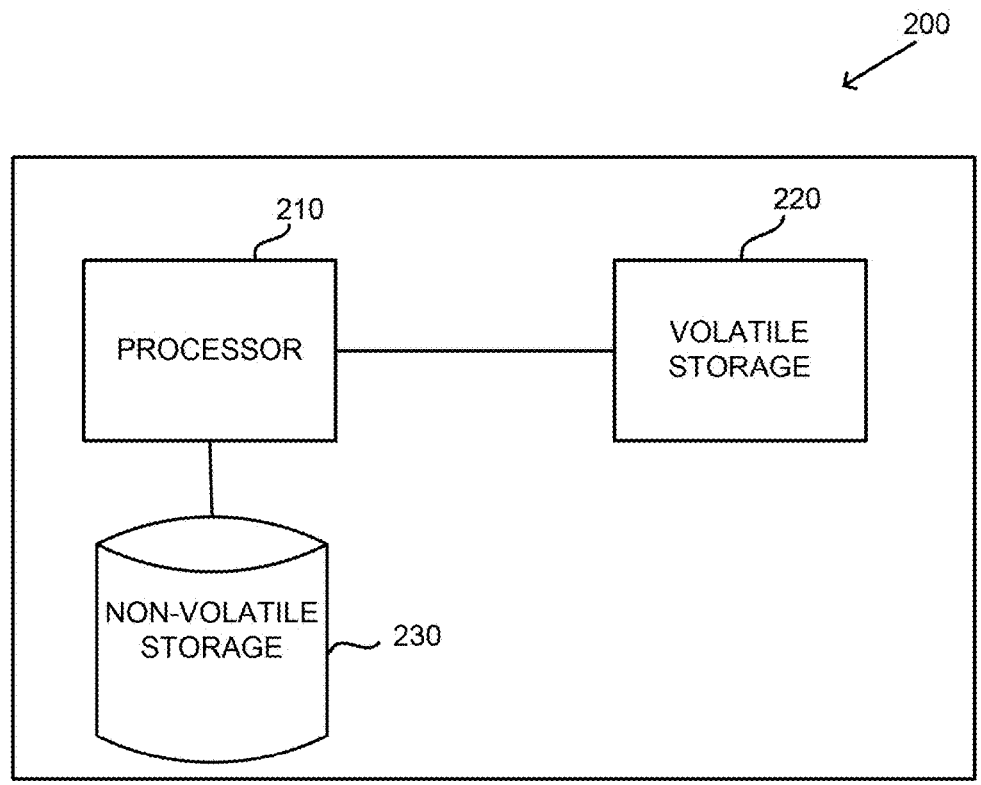
FIG. 7 illustrates an exemplary computer system that may be used in connection with some embodiments.

An illustrative implementation of a computer system 200 that may be used in connection with some embodiments is shown in FIG. 7. One or more computer systems such as computer system 200 may be used to implement any of the functionality described above. The computer system 200 may include one or more processors 210 and one or more computer-readable storage media (i.e., tangible, non-transitory computer-readable media), e.g., volatile storage 220 and one or more non-volatile storage media 230, which may be formed of any suitable non-volatile data storage media. The processor 210 may control writing data to and reading data from the volatile storage 220 and/or the non-volatile storage device 230 in any suitable manner, as aspects of the present invention are not limited in this respect. To perform any of the functionality described herein, processor 210 may execute one or more instructions stored in one or more computer-readable storage media (e.g., volatile storage 220 and/or non-volatile storage 230), which may serve as tangible, non-transitory computer-readable media storing instructions for execution by the processor 210.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one embodiment comprises at least one computer-readable storage medium (i.e., at least one tangible, non-transitory computer-readable medium, e.g., a computer memory (e.g., hard drive, flash memory, processor working memory, etc.), a floppy disk, an optical disc, a magnetic tape, or other tangible, non-transitory computer-readable medium) encoded with a computer program (i.e., a plurality of instructions), which, when executed on one or more processors, performs above-discussed functions. The computer-readable storage medium can be transportable such that the program stored thereon can be loaded onto any computer resource to implement aspects discussed herein. In addition, it should be appreciated that the reference to a computer program which, when executed, performs above-discussed functions, is not limited to an application program running on a host computer. Rather, the term "computer program" is used herein in a generic sense to reference any type of computer code (e.g., software or microcode) that can be employed to program one or more processors to implement above-discussed aspects.

Having described several embodiments in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method comprising:
training an acoustic model of a speech recognition engine using input speech to identify features from the input speech and to classify the input speech based on identified features, wherein training the acoustic model comprises:
training a neural network of the speech recognition engine using the input speech to recognize features from the input speech, wherein training the neural network to recognize the features comprises training a filter bank of the neural network using the input speech, wherein the filter bank of the neural network is inside the neural network, and wherein the filter bank is configured to take a speech frame power spectrum as input; and
jointly with training the filter bank of the neural network, training a classifier of the neural network using the input speech to classify the input speech based on features generated using output of the filter bank, wherein jointly training the filter bank of the neural network and the classifier of the neural network comprises:
processing a frame of the input speech to produce a power spectrum for the frame of the input speech; and
passing the power spectrum through the filter bank to create filter bank output.

2. The method of claim 1, wherein:
the neural network comprises at least two layers; and
the filter bank is at least a part of one of the at least two layers.

3. The method of claim 2, wherein the filter bank comprises a plurality of weights and the plurality of weights form at least a part of a layer of the at least two layers of the neural network, and wherein each weight of the plurality of weights operates on a subset of frequency components of the power spectrum, and wherein jointly training the filter bank of the neural network and the classifier of the neural network comprises:
generating a set of features of the frame based on the filter bank output;
determining, using the classifier of the neural network, a classification for the frame based on the set of features;
computing an error measure by comparing the classification to a target classification for the frame; and
training the filter bank and the classifier based on the error measure, wherein training the filter bank comprises adjusting the plurality of weights of the neural network based on the error measure.

4. The method of claim 3, wherein adjusting the plurality of weights comprises adjusting the plurality of weights using back propagation of the error measure between the classification and the target classification.

5. The method of claim 1, wherein:
processing the frame of the input speech to produce a power spectrum for the frame comprises producing a normalized power spectrum for the frame; and
jointly training the filter bank and the classifier of the neural network using the input speech comprises jointly training the filter bank and the classifier of the neural network based at least in part on the normalized power spectrum.

6. The method of claim 5, wherein processing the frame of the input speech to produce the normalized power spectrum for the frame comprises:
processing the frame to produce a power spectrum for the frame;
performing a non-linear transformation on the power spectrum to produce a non-linear power spectrum;
normalizing the non-linear power spectrum to produce a normalized non-linear power spectrum; and
performing a second transformation on the normalized non-linear power spectrum to produce the normalized power spectrum.

7. The method of claim 1, wherein training the neural network of the speech recognition engine using the input speech to recognize features included in the input speech comprises training the neural network to recognize static features and dynamic features.

8. The method of claim 7, wherein:
training the neural network to recognize static features comprises training the neural network to recognize mel features; and
training the neural network to recognize dynamic features comprises training the neural network to recognize delta features and/or double-delta features.

9. The method of claim 1, wherein training the filter bank of the neural network using the input speech comprises training a filter bank using frequency pooling.

10. The method of claim 9, wherein training the filter bank using frequency pooling comprises training a filter bank that includes a plurality of filters, wherein each filter is associated with a frequency band centered at a center frequency identified by vocal-tract-length-normalization filters.

11. The method of claim 1, wherein training the filter bank of the neural network using the input speech comprises training a filter bank having a plurality of filters initialized as Gaussian filters.

12. The method of claim 1, wherein training the filter bank of the neural network using the input speech comprises training a filter bank having a plurality of filters initialized as mel filters.

13. The method of claim 1, wherein:
the method further comprises:
applying vocal tract length normalization to the power spectrum to produce a warped power spectrum; and
jointly training the filter bank and the classifier of the neural network using the input speech comprises jointly training the filter bank and the classifier of the neural network based at least in part on the warped power spectrum.

14. The method of claim 1, wherein training the classifier of the neural network to classify the input speech based on features comprises, for each set of localized features identified by the classifier, concatenating an i-vector with the set of localized features.

15. The method of claim 14, wherein training the classifier of the neural network to classify the input speech based on features comprises, for each time-frequency patch, concatenating an i-vector with the time-frequency patch.

16. The method of claim 1, wherein:
the neural network comprises a first layer, a second layer, and at least one third layer;
the first layer comprises the filter bank;
the second layer is arranged as a deep neural network;
the at least one third layer is arranged as a convolutional neural network; and
training the classifier of the neural network to classify the input speech based on features comprises training the deep neural network using the input speech and at least one i-vector.

17. The method of claim 1, wherein jointly training the filter bank and the classifier of the neural network of the speech recognition engine comprises jointly training a filter bank and classifier of a deep neural network of the speech recognition engine.

18. The method of claim 17, wherein jointly training a filter bank and classifier of a deep neural network comprises jointly training a filter bank and classifier of a convolutional neural network of the speech recognition engine.

19. At least one non-transitory computer-readable storage medium having encoded thereon executable instructions that, when executed by at least one processor, cause the at least one processor to carry out a method, the method comprising:
training an acoustic model of a speech recognition engine using input speech to identify features from the input speech and to classify the input speech based on identified features, wherein training the acoustic model comprises:
training a neural network of the speech recognition engine using the input speech to recognize features from the input speech, wherein training the neural network to recognize the features comprises training a filter bank of the neural network using the input speech, wherein the filter bank of the neural network is inside the neural network, and wherein the filter bank is configured to take a speech frame power spectrum as input; and
jointly with training the filter bank of the neural network, training a classifier of the neural network using the input speech to classify the input speech based on features generated using output of the filter bank, wherein jointly training the filter bank of the neural network and the classifier of the neural network comprises:
processing a frame of the input speech to produce a power spectrum for the frame of the input speech; and
passing the power spectrum through the filter bank to create filter bank output.

20. The computer-readable storage medium of claim 19, wherein training the filter bank of the neural network using the input speech comprises training a filter bank using frequency pooling.

21. The computer-readable storage medium of claim 20, wherein training the filter bank using frequency pooling comprises training a filter bank that includes a plurality of filters, wherein each filter is associated with a frequency band centered at a center frequency identified by vocal-tract-length-normalization filters.

22. The computer-readable storage medium of claim 19, wherein:
the method further comprises:
applying vocal tract length normalization to the power spectrum to produce a warped power spectrum; and
jointly training the filter bank and the classifier of the neural network using the input speech comprises jointly training the filter bank and the classifier of the neural network based at least in part on the warped power spectrum.

23. A system comprising:
at least one processor;
at least one non-transitory computer-readable storage medium having encoded thereon executable instructions that, when executed by the at least one processor, cause the at least one processor to perform:
training an acoustic model of a speech recognition engine using input speech to identify features from the input speech and to classify the input speech based on identified features, wherein training the acoustic model comprises:
training a neural network of the speech recognition engine using the input speech to recognize features from the input speech, wherein training the neural network to recognize the features comprises training a filter bank of the neural network using the input speech, wherein the filter bank of the neural network is inside the neural network, and wherein the filter bank is configured to take a speech frame power spectrum as input; and
jointly with training the filter bank of the neural network, training a classifier of the neural network using the input speech to classify the input speech based on features generated using output of the filter bank, wherein jointly training the filter bank of the neural network and the classifier of the neural network comprises:
processing a frame of the input speech to produce a power spectrum for the frame of the input speech; and
passing the power spectrum through the filter bank to create filter bank output.

24. The system of claim 23, wherein training the filter bank of the neural network using the input speech comprises training a filter bank using frequency pooling.

25. The system of claim 24, wherein training the filter bank using frequency pooling comprises training a filter bank that includes a plurality of filters, wherein each filter is associated with a frequency band centered at a center frequency identified by vocal-tract-length-normalization filters.

26. The system of claim 23, wherein the executable instructions cause the at least one processor to further perform:

applying vocal tract length normalization to the power spectrum to produce a warped power spectrum; and jointly training the filter bank and the classifier of the neural network using the input speech comprises jointly training the filter bank and the classifier of the neural network based at least in part on the warped power spectrum.

\* \* \* \* \*